Jan. 8, 1952     E. C. HORTON     2,581,660
ACTUATOR FOR CONVERTIBLE VEHICLE TOPS
Filed Feb. 12, 1948
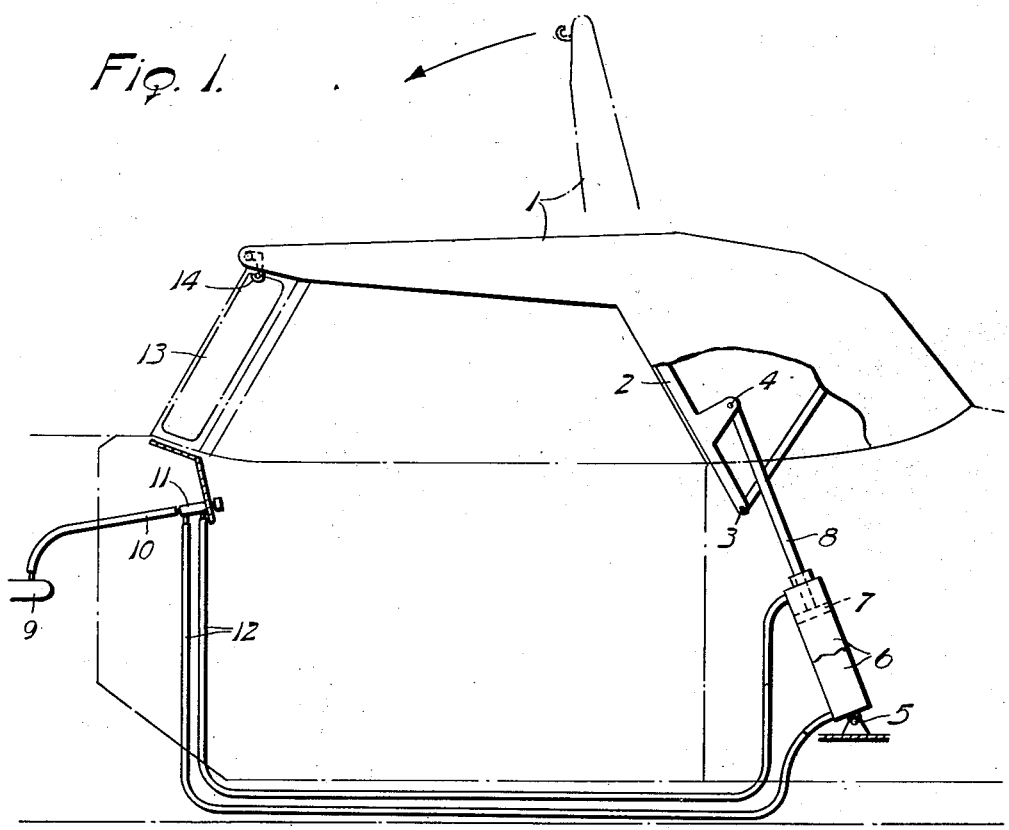
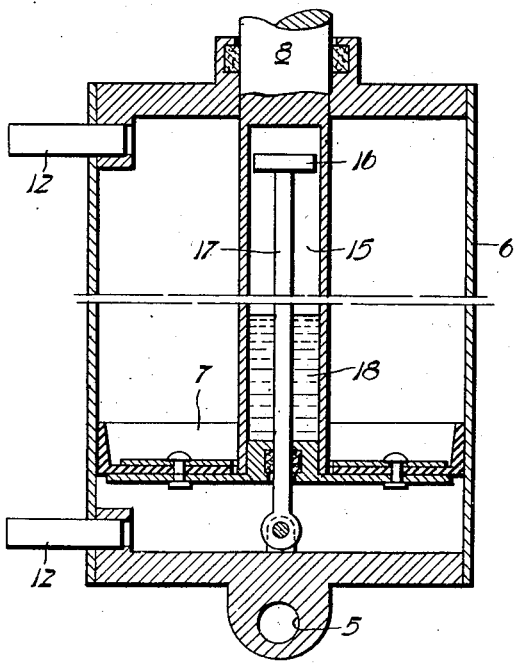
INVENTOR
*Erwin C. Horton*
BY
*Bean, Brooks, Buckley & Bean*
ATTORNEYS Patented Jan. 8, 1952

2,581,660

UNITED STATES PATENT OFFICE 2,581,660

ACTUATOR FOR CONVERTIBLE VEHICLE TOPS

Erwin C. Horton, Hamburg, N. Y., assignor to Trico Products Corporation, Buffalo, N. Y.

Application February 12, 1948, Serial No. 7,813

2 Claims. (Cl. 296—117)

This invention relates to an automobile of the convertible type in which the top is foldable and extensible to provide either an open weather car or a closed car. It has heretofore been proposed to adapt power equipment to the collapsible top frame for facilitating the conversion of the vehicle from one to the other of its styles. The top adjustments heretofore designed have caused the top to seat violently upon the vehicle windshield with likelihood of resulting damage.

The object of the present invention is to provide a top adjusting mechanism which will effect the desired adjustment in a facile and efficient manner.

The invention further resides in an arrangement by which the collapsible top is extended and folded with a differential movement enabling a rapid top-raising movement which will be practical and quiet and a top-lowering movement which will insure a compact fold for storage.

The foregoing and other objects will become manifest as this description progresses in which reference is made to the accompanying drawing wherein Fig. 1 is a diagrammatic showing of a convertible car embodying the present invention; and Fig. 2 is an enlarged view, in longitudinal section, of the top adjusting motor.

Referring more particularly to the drawing, the numeral 1 indicates the collapsible top structure including a lever 2 on each side of the vehicle which is pivotally mounted at 3 and pivotally connected to the top adjusting pneumatic motor at 4. The motor is pivotally mounted at 5 on the vehicle body and comprises a chamber 6 and a piston 7 therein with a piston rod 8 protruding therefrom. A source of operating pressure, such as the intake manifold 9 of the vehicle engine, is selectively connected by a conduit 10, a control valve 11, and the branch passages 12, to one or the other end of the motor chamber 6 while the opposite end is vented to the atmosphere, thereby providing the required pressure differential to adjust the top. In its raised position the top is usually fastened to the windshield 13 by hooks 14.

As the top is being raised its unfolding structure will initially swing forwardly and extend its front portion upwardly to the highest arc of its travel, substantially to the position shown by the dot and dash lines, and thereafter the front portion will swing downwardly onto the transverse frame member of the windshield. This descent is accelerated by reason of the increased leverage afforded as the cross braces and frame pieces of the top structure extend. It is therefore possible for the front frame member to strike the windshield with a violent impact.

In accordance with the present invention, means are provided to control the final stages of the top extending operation whereby to avoid possible structural damage and personal injury and to insure a quiet but nevertheless firm engagement of the top with the support affording windshield. To this end motion retarding means are provided to check and control the descent of the top upon the windshield. In the illustrated embodiment such retarding means are incorporated in the motor and comprise an auxiliary chamber 15 and a plunger 16 therein. Herein the chamber is formed in the piston and extends into the piston rod. The plunger is anchored by a stem 17 to the floor or bottom wall of the motor chamber. Bypass communication around the plunger may be simply a prescribed clearance between the plunger and the chamber wall sufficient to retard the unfolding top. To facilitate this control a liquid 18 is employed in the chamber to bypass the plunger, and in order to confine this retardant action to the final stages of the top raising adjustment the chamber is only partly filled with the liquid. Therefore, the top structure will be initially unfolded by the full energy output of the motor unhindered by the retarding means, while the concluding movement will be dampened when the plunger enters the body of liquid. This dash pot action will enable the top to descend gently upon the windshield for securement by the fasteners 14. Upon the reverse operation the initial folding movement will be controlled against a sudden lift up into the air, and the final folding movement will be effected unhindered by the retarding means. Thus, the folding will be powered into a compact assemblage.

The top mechanism is practical and safe in operation. The extensible frame, with its final rapid elongation over to the windshield, is controlled by the incompressible liquid so as to avoid too great an acceleration during its descent thereon. The pneumatic motor gives the advantages of a rapid adjustment for the major part of the top movement with the other part modified by the hydraulic fluid. The construction is simple and durable, and while the description is given in detail it is without thought of limitation since the inventive principles involved are capable of assuming other physical embodiments without departing from the spirit of the invention and the scope of the appended claims.

What is claimed is:

1. An operating mechanism for use with a collapsible, pivoted automobile top, which top is extensible from a folded position with an upward swinging motion through a top arc and downwardly therefrom to an operative position, in which position its forward end rests upon the vehicle windshield support structure, said mechanism including a fluid motor having a cylinder and a sliding piston which are relatively movable and one of which is connected to the body of the vehicle and the other to the movable top, a fluid retarder including cylinder and piston parts arranged within the motor cylinder, one of said parts being attached to and movable with said motor cylinder and the other part being supported by and movable with the motor piston, said retarder having an effective operation to resist only that part of the motor operation synchronized with the downward movement of the top after its movement through its top arc.

2. An operating mechanism for use with a collapsible, pivoted automobile top, which top is extensible from a folded position with an upward swinging motion through a top arc and downwardly therefrom to an operative position, in which position its forward end rests upon the vehicle windshield support structure, said mechanism including a fluid motor having a cylinder and a sliding piston which are relatively movable and one of which is connected to the body of the vehicle and the other to the movable top, a liquid retarder including cylinder and piston parts, said cylinder containing liquid to a pre-determined level and said piston being unretarded in its movement except through that portion of its stroke wherein said piston travels through said liquid, one of the parts being attached to and movable with the motor cylinder and the other part being supported by and movable with the motor piston, the effective operation of said retarder being defined by the liquid level to resist only that part of the motor operation synchronized with the downward movement of the top after the movement of the latter through its top arc.

ERWIN C. HORTON.

REFERENCES CITED

The following references are of record in the file of this patent:

UNITED STATES PATENTS

| Number | Name | Date |
|---|---|---|
| 700,404 | Braden et al. | May 20, 1902 |
| 1,926,757 | Tendero | Sept. 12, 1933 |
| 2,128,849 | Redfern | Aug. 30, 1938 |
| 2,141,541 | Levy | Dec. 27, 1938 |
| 2,331,603 | Falcon | Oct. 12, 1943 |

FOREIGN PATENTS

| Number | Country | Date |
|---|---|---|
| 475,815 | Great Britain | Nov. 25, 1937 |